Aug. 12, 1930.       C. V. KOONS       1,773,045
SWIVEL HOOK
Filed June 29, 1929

Inventor:
Charles V. Koons,
by his Attorneys
Howson & Howson

Patented Aug. 12, 1930

1,773,045

UNITED STATES PATENT OFFICE

CHARLES VERNON KOONS, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA

SWIVEL HOOK

Application filed June 29, 1929. Serial No. 374,899.

The principal object of this invention is to provide a novel swivel hook assemblage having improved characteristics of ruggedness and simplicity.

Another object of the invention is to provide a swivel hook assemblage in which the hook element may be readily detached from the suspension means.

The invention further resides in a novel form of coupling whereby the stresses are distributed over a relatively large surface area, thereby materially increasing the strength and durability of the connection between the hook and the suspension means.

The invention further resides in certain novel and improved structural details, as hereinafter set forth and as illustrated in the attached drawings, in which.

Figure 1:
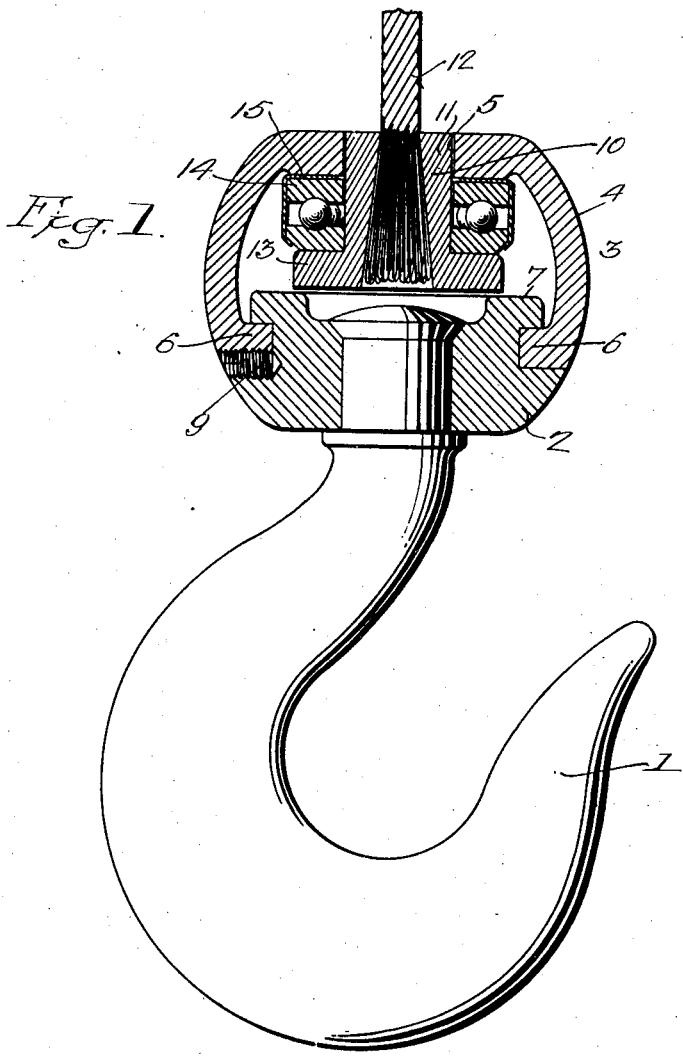
Figure 1 is a vertical sectional view of the swivel hook assemblage.
Figure 2:
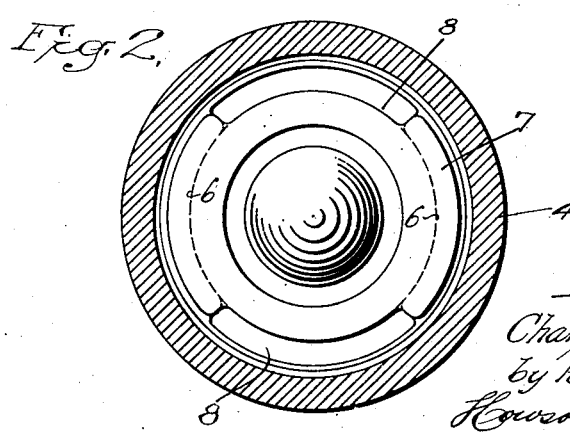
Fig. 2 is a transverse section on the line 2—2, Fig. 1.

Referring to the drawings, the hook designated by the reference numeral 1 is permanently fixed by riveting into a member 2 which constitutes one part of a housing 3. The other part 4 of the housing is a substantially bell-shaped member having an opening 5 at the top and having projecting inwardly from its lower edge segmental flanges 6, 6, which are adapted in assemblage and as illustrated to interlock with opposed segmental flanges 7, 7 on the housing part 2 to thereby hold the housing parts together. The flanges 7, 7 are of a length permitting their insertion between the ends of the flanges 6, 6, after which a relative rotation of the housing parts through a relatively small angle, in the present instance approximately 90°, brings the flanges in the superimposed interlocked position. In Fig. 2, the space between the ends of the flanges 6, 6 of the member 4 is designated by the reference numeral 8. A set screw 9 is provided which passes through the parts 2—4, as illustrated in Fig. 1, to prevent accidental relative rotational movement of the housing parts causing accidental separation of the hook from the suspension means.

Within the housing 3 is an element 10, this element comprising a cylindrical part 11 which projects freely into the housing opening 5. This element, which is adapted to receive and have attached thereto suitable suspension means consisting in the present instance of a cable 12, has at the base of the cylindrical portion 11 an annular transverse flange 13 which constitutes a seat for an antifriction bearing 14 surrounding the cylindrical part 11. The housing member 4 is formed with an interior annular plane surface 15 surrounding the opening 5, which surface engages the top of the bearing 14 whereby the latter supports the housing in a manner affording free rotational movement between the suspension means 12, secured in the element 10, and the hook 1 carried by the housing 3.

It will be noted that the actual bearing surface between the suspension means and the hook is a relatively extended one giving relatively great strength; and that the assemblage is an extremely simple one in which the hook is readily detachable from the suspension means by merely releasing the set screw 9 and relatively turning the housing parts through a small angle.

I claim:

1. I a swivel hook, the combination with a two-part housing having a top opening, of a hook permanently fixed in one of said parts, interlocking means in said parts releasable by a relative rotary movement of said parts through a small angle, releasable means for preventing said relative rotary movement, a supporting member extending into the casing through said opening, and an anti-friction bearing carried by said member and constituting a support for the casing.

2. In a swivel hook, the combination with a two-part housing having a top opening, of a hook permanently fixed in one of said parts, means for releasably securing said parts together, a shouldered element within the housing having a part projecting freely into said top opening, said element beign adapted for attachment to suspension means, and an antifriction bearing mounted on the said shoulder and supporting the housing.

3. In a swivel hook, the combination with a two-part housing having a top opening, of a hook permanently fixed in one of said parts, means for releasably securing said parts together, an element within the housing having a part projecting freely into said top opening and adapted for reception of suspension means, and having below said part a transverse annular flange, and an anti-friction bearing surrounding the said projecting part of said element and seated on the flange, said housing having an interior annular plane surface surrrounding the top opening and engaging the top of said bearing to thereby support the housing.

4. In a swivel hook, the combination with a two-part housing, one part of said housing being substantially bell-shaped and having a top opening, and having at the lower edge thereof transversely projecting flanges spaced apart at their ends, a hook permanently secured in the other part of said housing, said latter part having at the top transversely projecting flange elements adapted for insertion between the ends of the flanges of the upper housing part and adapted when the parts are thereafter relatively rotated to overlie the flanges of the upper part to thereby unite the parts of the housing, releasable means for preventing relative rotational movement of said housing parts, an element within the housing and having a part projecting freely into said top opening, said element being adapted for reception of suspension means, and an anti-friction bearing seated on said element and supporting said housing.

CHARLES VERNON KOONS.